(12) United States Patent
Davis, Jr. et al.

(10) Patent No.: US 6,298,291 B1
(45) Date of Patent: Oct. 2, 2001

(54) METHOD OF ESTABLISHING BASELINE FILTER FOR AIR QUALITY

(75) Inventors: Leighton Ira Davis, Jr., Ann Arbor; John David Hoeschele, Detroit; Gerhard Allen Dage, Franklin, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/470,632

(22) Filed: Dec. 22, 1999

(51) Int. Cl.[7] ........................................................ B60H 3/06
(52) U.S. Cl. ............................ 701/36; 180/68.2; 55/283; 454/75
(58) Field of Search ............................ 701/36; 180/68.2; 454/69, 75, 74, 71, 156, 158; 55/283

(56) References Cited

U.S. PATENT DOCUMENTS

| | | |
|---|---|---|
| 4,305,724 | 12/1981 | Micko . |
| 4,399,684 | 8/1983 | Advani et al. . |
| 4,538,575 | 9/1985 | Chujo et al. . |
| 4,541,899 | 9/1985 | Mase et al. . |
| 4,542,640 | 9/1985 | Clifford . |
| 4,627,269 | 12/1986 | Forster et al. . |
| 4,763,564 * | 8/1988 | Czarnecki et al. ................... 98/2.11 |
| 4,880,519 | 11/1989 | Wang et al. . |
| 5,265,417 | 11/1993 | Visser et al. . |
| 5,320,383 * | 6/1994 | Chan et al. ........................ 280/735 |
| 5,448,905 | 9/1995 | Stetter et al. . |
| 5,451,371 | 9/1995 | Zanini-Fisher et al. . |
| 5,527,446 | 6/1996 | Kosek et al. . |
| 5,596,975 | 1/1997 | Thomas et al. . |
| 5,898,101 | 4/1999 | Lyle et al. . |
| 5,954,577 * | 9/1999 | Meckler ............................... 454/75 |

FOREIGN PATENT DOCUMENTS

WO 93/00581  1/1993  (WO) .

* cited by examiner

*Primary Examiner*—Richard M. Camby
(74) *Attorney, Agent, or Firm*—Larry I. Shelton

(57) ABSTRACT

A method of establishing a baseline filter for an air quality sensor in a motor vehicle includes the step of providing an air quality sensor for intake air into an occupant compartment of the motor vehicle. The method also includes the step of establishing a moving baseline for a background signal level from the air quality sensor. The method further includes the step of shutting off intake air into an occupant compartment of the motor vehicle when the background signal level exceeds a certain threshold above the moving baseline, thereby preventing undesired gases in the intake air from reaching occupants in the occupant compartment.

20 Claims, 2 Drawing Sheets

METHOD OF ESTABLISHING BASELINE FILTER FOR AIR QUALITY

BACKGROUND OF THE INVENTION

1. Field of the Invention

The present invention relates generally to air quality sensors and, more specifically, to a method of establishing a filtered baseline signal for an air quality sensor.

2. Description of the Related Art

Air quality sensors (AQS) are sensors that sense noxious gases. Such sensors can be used by a climate control system of a motor vehicle to shut off intake air into an occupant compartment of the motor vehicle, thus preventing pollution and undesired smells from reaching occupants in the occupant compartment. Typically, the air quality sensors use a heated thin film, which reacts with certain gases and changes resistance. These air quality sensors generally fall into one of two categories: reducing or oxidizing, according to the kind of gases they can detect. Reducing air quality sensors detect such gases as unburned hydrocarbons in diesel exhaust, carbon monoxide, methane from cattle in feedlots, etc. Oxidizing air quality sensors detect such gases as nitrogen oxides, ozone and chlorine.

The signal from the air quality sensors can be related to absolute concentrations of particular gases, but because the sensors detect such a wide variety of gases and are exposed in use to an unpredictable mix, comparing the signal to any absolute level is not very useful. Rather, it is desirable to take advantage of the transient characteristics of typical signals obtained from these air quality sensors on a moving motor vehicle. Most of the time, the air quality sensor will produce a background signal level characteristic of the regional air mass the motor vehicle is moving through. When the motor vehicle passes through a plume from a point source of detectable gases, a spike in the signal will occur and then fade away as the motor vehicle moves out of the plume. The background signal level will slowly change as the motor vehicle moves from one region to another such as from rural to urban areas.

It is desirable to provide a baseline filter for air quality sensor signal processing. It is also desirable to provide a baseline filter for establishing a moving baseline for the background signal level and take action when the signal level exceeds a certain threshold above this baseline for an air quality sensor. It is further desirable to provide a method that tracks the baseline of a signal from an air quality sensor without unduly following spikes. Therefore, there is a need in the art to provide a method of establishing a baseline filter for an air quality sensor.

SUMMARY OF THE INVENTION

Accordingly, the present invention is a method of establishing a baseline filter for an air quality sensor in a motor vehicle including the step of providing an air quality sensor for intake air into an occupant compartment of the motor vehicle. The method also includes the step of establishing a moving baseline for a background signal level from the air quality sensor. The method further includes the step of shutting off intake air into an occupant compartment of the motor vehicle when the background signal level exceeds a certain threshold above the moving baseline, thereby preventing undesired gases in the intake air from reaching occupants in the occupant compartment.

One advantage of the present invention is that a method is provided of establishing a baseline filter for an air quality sensor. Another advantage of the present invention is that the method tracks the baseline of a signal from an air quality sensor without following spikes, but following baseline changes while spikes occur. Yet another advantage of the present invention is that the method may be used with an unprocessed signal from an air quality sensor. Still another advantage of the present invention is that the baseline filter establishes a moving baseline for the background signal level so that action may be taken when the signal level exceeds a certain threshold above this baseline for an air quality sensor.

Other features and advantages of the present invention will be readily appreciated, as the same becomes better understood, after reading the subsequent description when considered in connection with the accompanying drawings.

DESCRIPTION OF THE PREFERRED EMBODIMENT(S)

Figure 1:
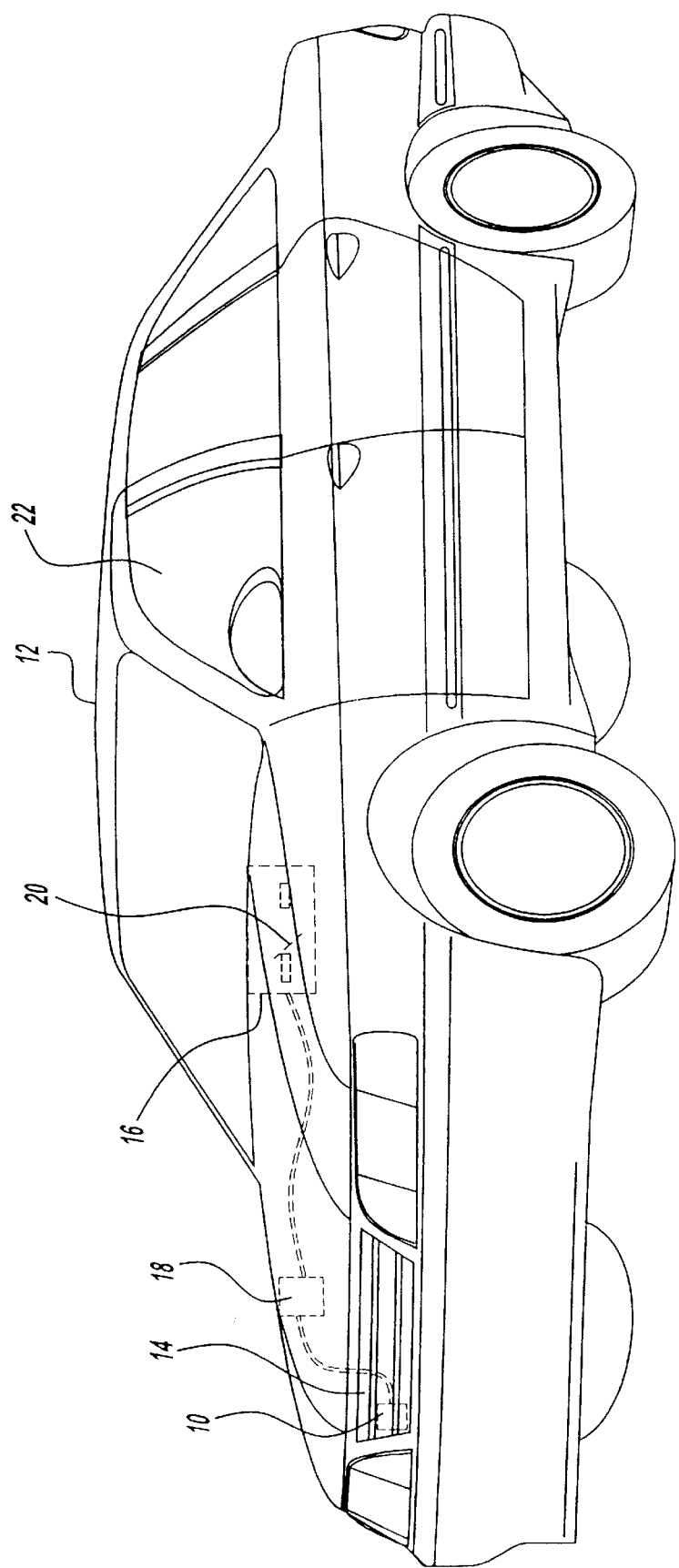
FIG. 1 is a diagrammatic view of an air quality sensor used with a method, according to the present invention, and illustrated in operational relationship with a motor vehicle.

Referring to the drawings and in particular FIG. 1, one embodiment of an air quality sensor 10 is illustrated in operational relationship with a motor vehicle 12. The air quality sensor 10 is located near an air inlet 14 of a climate control system 16 of the motor vehicle 12. The air quality sensor 10 is electrically connected to an electronic controller 18. The controller 18 is electrically connected to an actuator (not shown) of the climate control system 16 to move a door 20 to allow air from the air inlet 14 to enter an occupant compartment 22 or prevent air from the air inlet 14 from entering the occupant compartment 22 of the motor vehicle 12. The air quality sensor 10 may be of a reducing or oxidizing type. It should be appreciated that the air quality sensor 10, climate control system 16 and controller 18 are conventional and known in the art.

Figure 2:
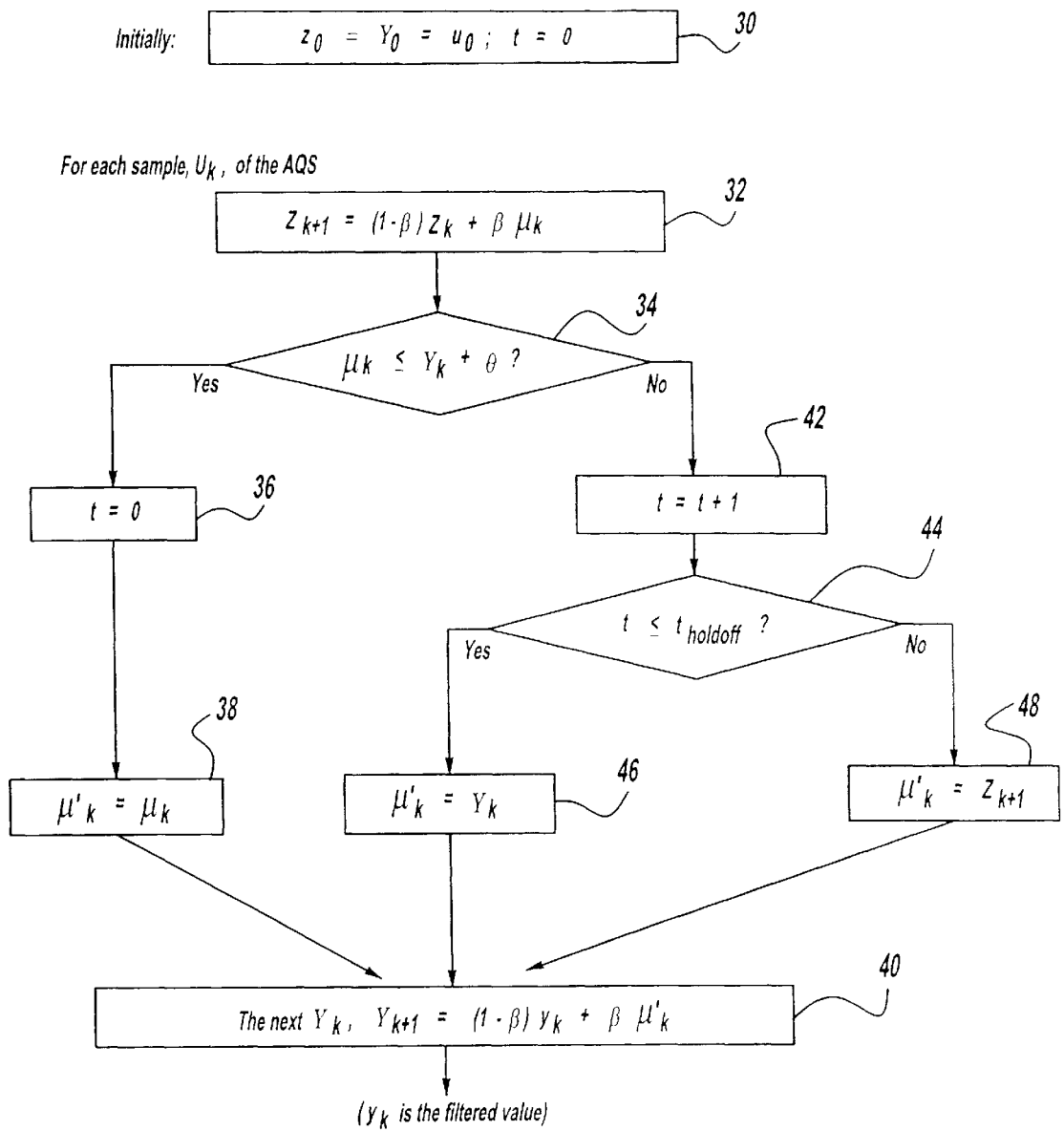
FIG. 2 is a flowchart of a method, according to the present invention, of establishing a baseline filter for the air quality sensor of FIG. 1.

Referring to FIG. 2, a method, according to the present invention, of establishing a baseline filter for the air quality sensor 10 is shown. The baseline filter establishes a moving baseline for a background signal level from the air quality sensor 10 so that action may be taken when the signal level exceeds a threshold above the baseline. For example, this action may be to shut off intake air from the air inlet 14 into the occupant compartment 22 of the motor vehicle 12 by the controller 18 sending a signal to the actuator to move the door 20, thus helping to protect the occupants from pollution and bad smells. The baseline filter tracks the baseline, to not follow spikes, but to follow baseline changes while spikes occur. It should be appreciated that the baseline filter may be implemented in fixed-point arithmetic for uses in embedded microprocessors of the controller 18.

According to the present invention, the standard equation for an exponentially weighted moving average (EWMA) is:

$$y_{k+1} = (1-\beta)y_k + \beta u_k \quad (1)$$

where $u_k$ is the input for the current time step k, $y_k$ is the previous (now current) value of the filter output, and $y_{k+1}$ is the next output value for the filter. The parameter, $\beta$, is related to the filter time constant, $\tau$, and time step interval, h, by $\beta = h/\tau$. For example, a sample time of one second and a time constant of ten seconds gives $\beta=0.1$ and $(1-\beta)=0.9$. This equation is recursive, convenient to use and simply combines the current input value with the previous filter output, weighted by $\beta$ and $1-\beta$, respectively. The previous filter output is a function of its previous input, and so forth, so each output is a function of all the previous inputs leading up to the current input.

It is possible to have an EWMA filter that has a different response depending on whether its value is moving up or down:

$$y_{k+1} = \begin{cases} (1-\beta_{up})\cdot y_k + \beta_{up}\cdot u_k, & u_k \geq y_k \\ (1-\beta_{down})\cdot y_k + \beta_{down}\cdot u_k, & u_k < y_k \end{cases} \quad (2)$$

If $\beta_{up}$ is considerably different from $\beta_{down}$, the EMWA filter output will tend to stay near one end or the other of the range of input values, in effect providing a sort of rectification of the signal. Choosing $\beta_{down}$ larger than $\beta_{up}$ would bias the filter towards the lower values of input. This might be one way of baseline filtering, but has some disadvantages with regard to noise characteristics.

It is straightforward to hold an EMWA at its current value by continuing to feed in that value as input:

$$y_{k+1}=(1-\beta)y_k+\beta y_k=y_k \quad (3)$$

The final algorithm for the baseline filter is given by:

$$y_{k+1}=(1-\beta)y_k+\beta u'_k \quad (4)$$

$$\text{where } u'_k = \begin{cases} u_k, & u_k \leq y_k + \theta \\ y_k, & u_k > y_k + \theta \text{ and } t \leq t_{holdoff} \\ (1-\beta)\cdot y_k + \beta\cdot u_k, & u_k > y_k + \theta \text{ and } t > t_{holdoff} \end{cases} \quad (5)$$

$\theta$ is a threshold value, for example 0.2 Volts, t is the time constant since $u_k$ exceeded $y_k+\theta$, and the door 20 is closed, and $t_{holdoff}$ is a predetermined or hold-off time, for example fifty seconds, before the baseline filter starts tracking the EWMA value of $u_k$.

Referring to FIG. 2, the method of establishing the baseline filter signal for the air quality sensor 10 is shown. The method begins in block 30 and initializes the terms $z_0$ and $y_0$ equal to $u_0$, and t equal to zero. The method advances to block 32, and for each sample of the signal from the air quality sensor 10, $u_k$, sensed from the air quality sensor 10, the method calculates an intermediate filtered value, $z_{k+1}$, according to the following equation:

$$z_{k+1}=(1-\beta)z_k+\beta u_k$$

The method advances from block 32 to diamond 34 and determines whether $u_k$ is less than or equal to $y_k+\theta$. If so, the method advances to block 36 and sets t equal to zero. The method then advances to block 38 and sets $u'_k$ equal to $u_k$. The method advances from block 38 to block 40 and calculates the moving baseline, $y_k$, according to the equation:

$$y_{k+1}=(1-\beta)y_k+\beta u'_k$$

where $y_k$ is the filtered value. The method then returns to block 32.

In diamond 34, if $u_k$ is not less than or equal to $y_k+\theta$, the method advances to block 42. In block 42, the method sets t equal to t+1. The method then advances to diamond 44 and determines whether t is less than or equal to $t_{holdoff}$. If so, the method advances to block 46 and sets $u'_k$ equal to $y_k$. The method then advances to block 40 previously described.

In diamond 44, if t is not less than or equal to $t_{holdoff}$, the method advances to block 48. In block 48, the method sets $u'_k$ equal to $z_{k+1}$. The method then advances to block 40 previously described. It should be appreciated that when the signal level, $u_{k+1}$, exceeds the threshold, $\theta$, above the moving baseline, $y_k$, the controller 18 sends a signal to the actuator to close the door 20 and prevent intake air from entering the occupant compartment 22 of the motor vehicle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of establishing a baseline filter for an air quality sensor in a motor vehicle, said method comprising the steps of:
   providing an air quality sensor for intake air into an occupant compartment of the motor vehicle;
   establishing a moving baseline for a background signal level from the air quality sensor; and
   shutting off intake air into an occupant compartment of the motor vehicle when the background signal level exceeds a certain threshold above the moving baseline, thereby preventing undesired gases in the intake air from reaching occupants in the occupant compartment.

2. A method of establishing a baseline filter for an air quality sensor in a motor vehicle, said method comprising the steps of:
   providing an air quality sensor for intake air into an occupant compartment of the motor vehicle;
   establishing a moving baseline for a background signal level from the air quality sensor; and
   shutting off intake air into an occupant compartment of the motor vehicle when the background signal level exceeds a certain threshold above the moving baseline, thereby preventing undesired gases in the intake air from reaching occupants in the occupant compartment; and
   wherein said step of establishing comprises calculating the moving baseline according to the equation $y_{k+1}=(1-\beta)y_k+\beta u'_k$.

3. A method of establishing a baseline filter for an air quality sensor in a motor vehicle, said method comprising the steps of:
   providing an air quality sensor for intake air into an occupant compartment of the motor vehicle;
   establishing a moving baseline for a background signal level from the air quality sensor; and
   shutting off intake air into an occupant compartment of the motor vehicle when the background signal level exceeds a certain threshold above the moving baseline, thereby preventing undesired gases in the intake air from reaching occupants in the occupant compartment; and
   initializing time t equal to zero.

4. A method of establishing a baseline filter for an air quality sensor in a motor vehicle, said method comprising the steps of:
   providing an air quality sensor for intake air into an occupant compartment of the motor vehicle;
   establishing a moving baseline for a background signal level from the air quality sensor; and shutting off intake air into an occupant compartment of the motor vehicle when the background signal level exceeds a certain threshold above the moving baseline, thereby preventing undesired gases in the intake air from reaching occupants in the occupant compartment; and calculating an intermediate signal level according to the equation $z_{k+1}=(1-\beta)z_k+\beta u_k$.

5. A method as set forth in claim 4 including the step of determining whether a sample of the signal from the air quality sensor, $u_k$, is less than or equal to the moving baseline, $y_k$, plus a threshold, $\theta$.

6. A method as set forth in claim 5 including the step of setting time t equal to zero if the sample of the signal from the air quality sensor is less than or equal to the moving baseline plus the threshold.

7. A method as set forth in claim 6 including the step of setting $u'_k$ equal to $u_k$.

8. A method as set forth in claim 6 including the step of calculating the moving baseline according to the equation $y_{k+1}=(1-\beta)y_k+\beta u'_k$.

9. A method as set forth in claim 4 including the step of setting time t equal to t+1 if the sensed sample of air is not less than or equal to the moving baseline plus the threshold.

10. A method as set forth in claim 9 including the step of determining whether the time t is less than or equal to a hold-off time, $t_{holdoff}$.

11. A method as set forth in claim 10 including the step of setting $u'_k$ equal to $y_k$ if the time t is less than or equal to $t_{holdoff}$.

12. A method as set forth in claim 11 including the step of calculating the final moving baseline according to the equation $y_{k+1}=(1-\beta)y_k+\beta u'_k$.

13. A method as set forth in claim 10 including the step of setting $u'_k$ equal to $z_{k+1}$ if the time t is not less than or equal to $t_{holdoff}$.

14. A method as set forth in claim 13 including the step of calculating the final moving baseline according to the equation $y_{k+1}=(1-\beta)y_k+\beta u'_k$.

15. A method of establishing a baseline filter for an air quality sensor in a motor vehicle, said method comprising the steps of:

providing an air quality sensor for intake air into an occupant compartment of the motor vehicle;

establishing a moving baseline for a background signal level from the air quality sensor by calculating an intermediate signal level according to the equation $z_{k+1}=(1-\beta)z_k+\beta u_k$ and calculating the moving baseline according to the equation $y_{k+1}=(1-\beta)y_k+\beta u'_k$; and shutting off intake air into an occupant compartment of the motor vehicle when the background signal level exceeds a certain threshold above the moving baseline, thereby preventing undesired gases in the intake air from reaching occupants in the occupant compartment.

16. A method of establishing a baseline filter for an air quality sensor in a motor vehicle, said method comprising the steps of:

providing an air quality sensor for intake air into an occupant compartment of the motor vehicle;

establishing a moving baseline for a background signal level from the air quality sensor by calculating an intermediate signal level according to the equation $z_{k+1}=(1-\beta)z_k+\beta u_k$ and calculating the moving baseline according to the equation $y_{k+1}=(1-\beta)y_k+\beta u'_k$; and shutting off intake air into an occupant compartment of the motor vehicle when the background signal level exceeds a certain threshold above the moving baseline, thereby preventing undesired gases in the intake air from reaching occupants in the occupant compartment; and determining whether a sensed sample of air, $u_k$, is less than or equal to the moving baseline, $y_k$, plus a threshold, $\theta$.

17. A method as set forth in claim 16 including the step of setting time t equal to zero if the sensed sample of air is less than or equal to the moving baseline plus the threshold.

18. A method as set forth in claim 17 including the step of setting u'k equal to uk.

19. A method as set forth in claim 16 including the step of setting time t equal to t+1 if the sensed sample of air is not less than or equal to the moving baseline plus the threshold.

20. A method as set forth in claim 19 including the step of determining whether the time t is less than or equal to a hold-off time, $t_{holdoff}$, setting $u'_k$ equal to $y_k$ if the time t is less than or equal to $t_{holdoff}$, and setting $u'_k$ equal to $z_{k+1}$ if the time t is not less than or equal to $t_{holdoff}$.

* * * * *